Oct. 11, 1949.   G. BRINKMANN   2,484,373
CONTROL VALVE FOR HYDRAULIC SYSTEMS
Filed Oct. 11, 1943   2 Sheets-Sheet 1

INVENTOR.
GUENTHER BRINKMANN
BY
ATTORNEY

Oct. 11, 1949. G. BRINKMANN 2,484,373
CONTROL VALVE FOR HYDRAULIC SYSTEMS
Filed Oct. 11, 1943 2 Sheets-Sheet 2
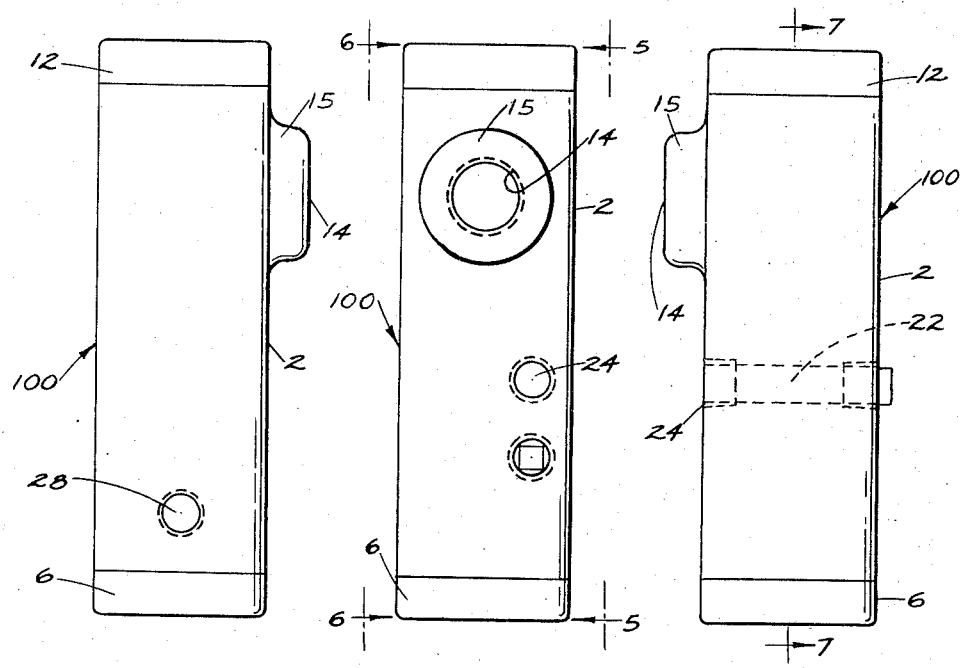
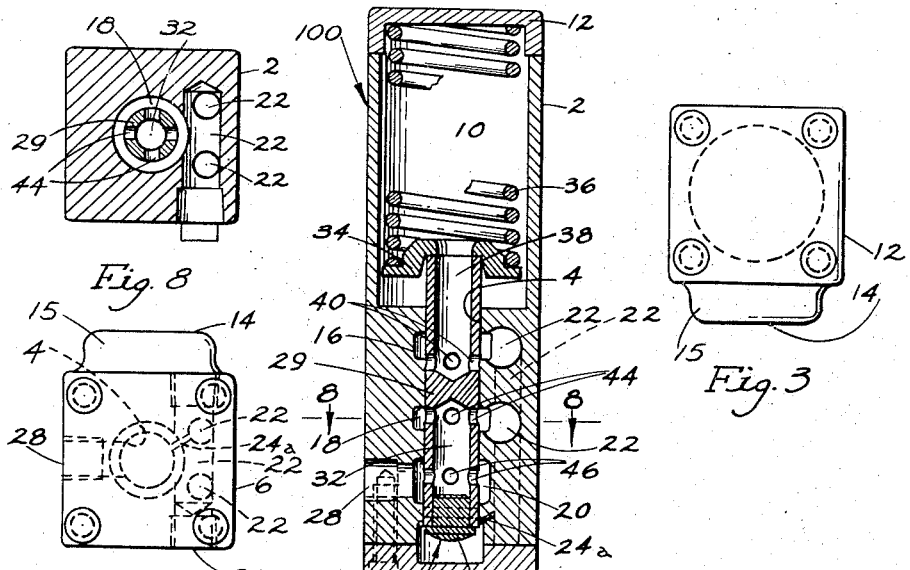
INVENTOR.
GUENTHER BRINKMANN
BY
ATTORNEY Patented Oct. 11, 1949

2,484,373

UNITED STATES PATENT OFFICE 2,484,373

CONTROL VALVE FOR HYDRAULIC SYSTEMS

Guenther Brinkmann, Detroit, Mich., assignor to Ex-Cell-O Corporation, Detroit, Mich., a corporation of Michigan Application October 11, 1943, Serial No. 505,796

4 Claims. (Cl. 137—153)

1

This invention relates to a control valve and more particularly to a control valve for use in a system including branched hydraulic circuits. The functions of such a valve are the protection of such a system against excess pressure and machines which may be associated therewith, against hazards incident to deficiencies of pressure in the system.

In the operation of hydraulically driven machines, such as machine tools having a multiplicity of fluid actuated mechanisms powered from a common source of fluid pressure, there are instances where an excessive reduction in pressure or a failure thereof might cause injury to the operator, the machine, or the work.

Such a condition may be illustrated by a grinding machine wherein a work table having a work holding chuck mounted thereon is arranged to have the table reciprocated and the work chuck closed respectively by branch circuits of the associated hydraulic system. In such case, the work is presented for cutting by a grinding wheel which usually is driven by a separate source of power, such as an electric motor.

Heretofore in such machines, one branch of the associated hydraulic system has been utilized to operate the work holding chuck and another branch of the system, without safety controls, has been utilized to furnish power to the table reciprocating means.

Under the former condition it is seen to be possible that, upon excessive reduction of hydraulic pressure in the system, the grip of the work holding chuck on the workpiece may become insecure before movement of the table will cease. In such an event the forces imposed by the grinding wheel upon the workpiece may be sufficient to tear the latter from the chuck, endangering the operator, the machine and the workpiece.

The dangerous condition illustrated may be completely avoided or substantially reduced if, upon excessive reduction of pressure in the hydraulic system, the fluid supplied for actuation of the table traverse is cut off before the pressure supplied for closing the work holding chuck has dropped to a point where failure of its grip upon the workpiece is imminent.

Cessation of fluid supply to the table reciprocating means has two effects which tend to prevent failure of the chuck to hold the workpiece. First, the discontinuance of table traverse ceases to present additional work stock for removal by the grinding wheel thus reducing the forces which must be resisted by the work chuck. Secondly, the very act of reducing the draft of hydraulic

2 fluid from the system occasioned by stoppage of movement of the machine table frequently enables the source of pressure fluid to maintain sufficient pressure upon the work chuck to avoid failure of its holding force.

It is, therefore, an object of my invention to provide a valve for controlling the pressure in a system of branched circuits in such a manner that a predetermined maximum of pressure is not permitted to be exceeded in any of said branches.

Another object of the invention is to provide a valve structure which will cut off the supply of fluid to certain of said system branches upon occurrence of a pressure supply to said system which is less than a predetermined minimum.

A further object of my invention is to provide a unitary control valve structure which will limit the maximum pressure in a system of branched circuits to a predetermined value and to interrupt the supply of fluid to certain of said branches when fluid is supplied to the system at less than such value.

A still further object is to provide a valve structure of simple, reliable and inexpensive construction in which the control functions previously mentioned are accomplished by a single valve member reciprocable in a valve casing.

In the drawings:

Fig. 2 is a front elevational view of my control valve.

Fig. 3 is a top plan view looking on Fig. 2.

Fig. 4 is a bottom plan view looking on Fig. 2.

Fig. 5 is a right elevation on face 5—5 of Fig. 2.

Fig. 6 is a left elevation on face 6—6 of Fig. 2.

Fig. 7 is a vertical section on 7—7 of Fig. 5.

Fig. 8 is a horizontal section on 8—8 of Fig. 7.

Figure 1:
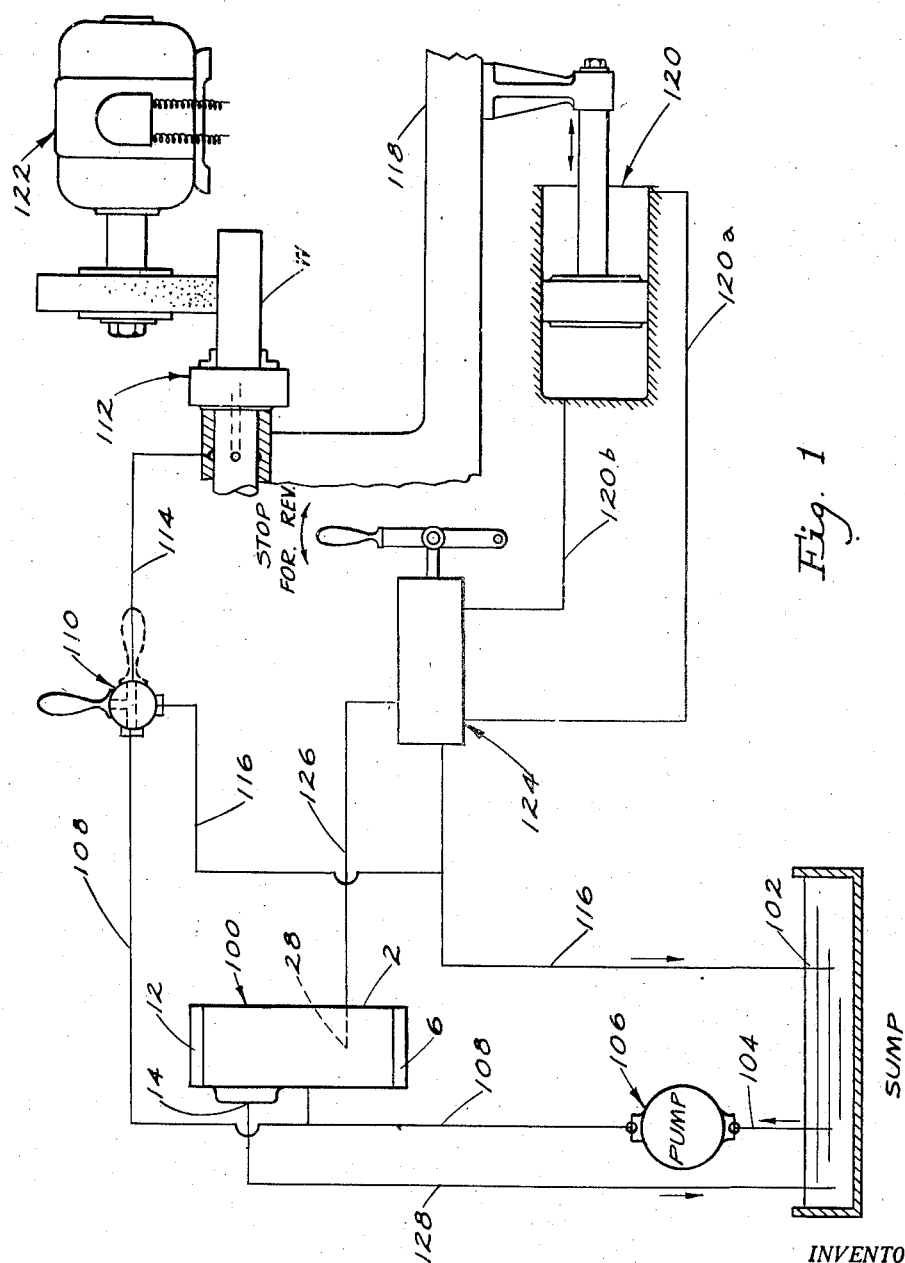
Fig. 1 is a schematic representation of my improved control valve in association with a source of fluid under pressure, a plurality of hydraulic circuit branches and a grinding machine.

Referring particularly to Fig. 1, my improved control valve generally indicated by the numeral 100 is shown in one illustrative environment wherein fluid under pressure is delivered thereto from a supply tank 102 through pump suction conduit 104, by fluid pressure pump 106 which may be of a wide variety of commonly known constructions. Pump 106 discharges into branched conduit 108, one branch thereof delivering fluid to the valve 100 and another, through a valve 110, is adapted to admit fluid pressure to a work holding chuck 112 to cause said chuck, which may be of any of the well-known constructions, to grip the work W. When valve 110 is turned to an alternative position, connection between pressure conduit 108 and conduit 114 is closed and the pressure in the chuck 112 and conduit 114 is relieved to branched exhaust conduit 116.

In the present instance, work chuck 112 is shown mounted upon a machine table 118 which is reciprocable upon a machine base (not shown) by a conventional actuator 120 whereby the work may be presented in cutting relation to a conventional grinding wheel head 122 which is here represented as being driven by electric motor means. This may be of any suitable construction and mounted on an infeed cross slide (not shown) or other portion of the machine in any suitable manner.

A manually operable valve 124 is adapted to control admission of pressure fluid from valve 100 through conduit 126 to either end of actuator 120 through associated conduits 120—a or 120—b to cause it to move in either direction or to be stopped at will. The exhaust fluid discharged from actuator 120 is returned to the supply tank through exhaust conduit 116. It will be understood that valve 124 may be actuated manually or automatically in any desired manner.

Through controlled ports and passages within the structure 100 which will later be described in detail, conduit 108 is connected with relief conduit 128 through a suitably variable restriction, bypassing to reservoir 102 that portion of the fluid displaced by pump 106 which is necessary to prevent the application of excessive pressures to the associated hydraulic system.

So long as the pressures applied upon conduit 108 lie within a normal range, continuous communication is maintained between conduit 108 and conduit 126 through valve 100. However, when the pressure applied on conduit 108 drops below a value which might render uncertain the ability of chuck 112 to hold the work W under any forces which might normally be applied thereto, the valve 100 interrupts the said communication and actuator 120 is rendered incapable of moving its associated machine table 118 regardless of the position of valve 124.

Referring to Figs. 2 through 8, the valve 100 is seen to include a body part 2 which is provided with a central bore 4, closed at the bottom end by a screw held cap 6. Throughout the upper end of body part 2, the bore 4 is enlarged to form a spring housing 10 closed at its upper end by cap 12. Housing 10 has a boss 15 traversed by a tapped opening 14 for receiving a return conduit 128 through which bypassed fluid is returned to the hydraulic sump or fluid supply tank.

Along the length of bore 4 are three spaced annular port enlargements 16, 18, and 20. Through branched passage 22, formed in body part 2, ports 16 and 18 are in constant communication with each other and with fluid pressure inlet 24 which is connected by branched conduit 108 to receive fluid under pressure from the fluid supply pump 106. Passage 22 also is in constant communication through a restricted snubber passage 24—a with the lower end of bore 4 and applies the pressure of pump 106 beneath the lower face of piston valve assembly 26. Port 20 is in constant communication with 28 which last is in constant communication with the conduit 126 of the circuit which is to have its fluid supply discontinued upon excessive pressure reduction in conduit 108. The piston valve assembly 26 includes a closely fitted piston valve member 28 slidable in bore 4, a lower cap and plug member 30 which fixedly closes a lower axial bore 32 in the piston 29 and a spring hanger 34 which rests and abuts upon the piston valve assembly 26 or upon shims or spacing washers which may be placed therebetween to predetermine the force which will be exerted on the assembly 26 by the spring 36. The lower end of the spring 36 bears upon hanger 34. The upper end of this spring is restrained by cap 12. The hanger 34 is formed with a central aperture which registers with an upper axial bore 38 in piston 29 continuously connecting upper bore 38 with spring housing 10, return passage 14, and return conduit 128.

The section Fig. 8 shows the lower axial bore 32 pierced by cross bores 44 and is typical of respective sections through valve 29 including cross bores 40 and 46.

It may now be seen that when the force of the spring 36 takes preponderance over the upwardly acting pressure applied on the lower face of valve assembly 26, the spring will hold the valve in its lowermost position severing communication between port 16 and cross holes 40. When the pressure of the pump 106 (or other source) applied through conduit 108, inlet 24, passages 22 and 24—a upon the lower face of valve assembly 26 takes the predominance, the valve will move upwardly against the resistance of spring 36 bringing port 16 into communication with cross bores 40, bore 38, housing 10, and exit passage 14 into return conduit 128. The pressure thus applied on assembly 26 will so govern the area of the communication that the maximum pressure generated by pump 106 will be limited to a predetermined value even though there be no other escape for fluid displaced by the pump.

In the lowermost position of valve 26, the top edge of cross holes 44 will be below the lower edge of port 18 and there will be no communication therebetween. However, in the rise of valve 26 from its lowermost position, communication at the last named point will be established before communication between port 16 and cross holes 40 is established. This means that, at some point in a progressive rise of pump pressure from zero to the pressure at which valve 26 begins to perform its bypassing function, a pressure is reached at which communication is established between inlet 24 and port 28 through passages 22, port 18, cross holes 44, bore 32, cross holes 46, port 20, and connection 28 to conduit 126. At all pump pressures above this value, fluid from the pump 106 may be discharged from outlet 28 into conduit 126, at all pressures below this value, the existing pressure of pump 106 is applied on conduit 108 but is cut off from conduit 126.

For illustrative purposes, let it now be considered that the normal working pressure of the pump 106 as determined by the valve 100, is 250 pounds per square inch and the holding force of the chuck 112 is acceptably safe at a minimum working pressure of 125 pounds per square inch. My control valve may then be constructed and adjusted to limit the maximum working pressure in conduits 108 and 126 to 250 pounds per square inch. If for any reason the pressure applied to conduit 108 drops below 125 pounds per square inch, the communication between conduits 108 and 126 made through valve 100 of Fig. 1 is severed and movement can no longer be given to table A regardless of the position of valve 124.

While my improved control valve has been illustratively shown in one of its simpler embodiments, it is susceptible to various modifications and alternative constructions as well as to many different uses. It is, therefore, my intention that the scope of the invention shall be limited only by the appended claims.

I claim as my invention:

1. A valve mechanism comprising, in combination, a casing having a valve bore opening at one end to a pressure chamber and at the other end to an open spring chamber, and formed with two axially-spaced fixed inlet ports and an outlet port opening to the periphery of said bore, said inlet ports being connected to said pressure chamber and adapted for connection to a source of pressure fluid, a valve member reciprocable in said bore and formed with an axial by-pass bore opening to said spring chamber and with a by-pass valve port opening from the periphery of said member to said axial bore for movement into and out of communication with one of said inlet ports, spring means disposed in said spring chamber and acting on said valve member to urge said member toward a closed position, said valve member being formed with a second axial bore in constant communication with said outlet port and with an inlet valve port opeing from the periphery of said member to said second bore for movement into and out of communication with the other of said inlet ports, said valve ports being spaced more closely than said inlet ports.

2. A valve mechanism comprising, in combination, a valve housing having a longitudinal valve bore opening at one end to a closed pressure chamber and at the other end to an enlarged exhaust chamber, said body being formed with an exhaust passage opening from said exhaust chamber, a fluid supply passage connected through a restricted snubber passage to said pressure chamber and opening in parallel to the periphery of said bore respectively through two axially-spaced by-pass and inlet grooves, and a pressure fluid discharge passage opening from the periphery of said bore through a relatively wide annular outlet groove at one side of the said first mentioned grooves, a single valve member slidable in said bore and projecting into said exhaust chamber, a coiled compression spring in said exhaust chamber and acting on said valve member in a direction to close the valve against the oppositely acting force of pressure fluid in said pressure chamber, said valve member being formed in one end portion with a set of radial relief ports movable into and out of communication with said by-pass groove and communicating with an axial bore opening to said exhaust chamber, and being formed in the other end portion with two sets of axially spaced inlet and outlet ports opening to an axial connecting bore closed from said pressure chamber, said outlet ports being in constant communication with said outlet groove and said inlet ports being movable into and out of communication with said inlet groove, said relief and inlet ports being more closely spaced than said by-pass and inlet grooves and being so located that in the opening movement of said valve member, said inlet ports will move into communication with said inlet groove before said relief ports are moved into communication with said by-pass groove.

3. A valve mechanism comprising, in combination, a valve housing having a longitudinal valve bore opening at one end to a closed pressure chamber and at the other end to an open exhaust chamber, said body being formed with a fluid supply passage connected through a restricted snubber passage to said pressure chamber and opening in parallel to the periphery of said bore respectively through two fixed axially-spaced by-pass and supply ports, and a pressure fluid discharge passage opening from the periphery of said bore through a fixed discharge port, an integral valve member slidable in said bore and projecting into said exhaust chamber, a coiled compression spring acting on said valve member in a direction to close the valve against the oppositely acting force of pressure fluid in said pressure chamber, said valve member being formed in one end portion with a relief valve port movable into and out of communication with said by-pass port and communicating with a longitudinal passage open to said exhaust chamber, and being formed in the other end portion respectively with axially-spaced inlet and outlet valve ports in intercommunication through a longitudinal connecting passage, said outlet valve port being in constant communication with said discharge port and said inlet valve port being movable into and out of communication with said supply port, said relief and inlet valve ports being more closely spaced than said by-pass and supply ports and being so located that in the opening movements of said valve member said inlet valve port will move into communication with said supply port before said relief port is moved into communication with said by-pass port.

4. A valve mechanism comprising, in combination, a valve housing having exhaust and discharge outlets and having a longitudinal valve bore opening at one end to a closed pressure chamber, said body being formed with a supply inlet connected to said pressure chamber and opening in parallel to the periphery of said bore respectively through two axially-spaced by-pass and supply ports, a single valve member slidable in said bore, a coiled compression spring acting on said valve member in a direction to close the valve against the oppositely acting force of pressure fluid in said pressure chamber, said valve member being formed in one end portion with a relief port in constant communication with said exhaust outlet and movable into and out of communication with said by-pass port, and being formed in the other end portion respectively with axially spaced intercommunicating inlet and outlet ports, said outlet port being in constant communication with said discharge outlet and said inlet port being movable into and out of communication with said supply port, said relief and inlet ports being more closely spaced than said by-pass and supply ports and being so located that in the opening movements of said valve member said inlet port will move into communication with said supply port before said relief port is moved into communication with said by-pass port.

GUENTHER BRINKMANN.

REFERENCES CITED

The following references are of record in the file of this patent:

UNITED STATES PATENTS

| Number | Name | Date |
| --- | --- | --- |
| 1,655,173 | Webber | Jan. 3, 1928 |
| 1,999,697 | Kleckner | Apr. 30, 1935 |
| 1,999,698 | Kleckner | Apr. 30, 1935 |
| 2,059,457 | Horton | Nov. 3, 1936 |
| 2,104,390 | Murphy | Jan. 4, 1938 |
| 2,118,779 | Rippl | May 24, 1938 |
| 2,154,038 | Evrell | Apr. 11, 1939 |
| 2,167,328 | Beggs | July 25, 1939 |